United States Patent
Xie

(10) Patent No.: US 9,106,566 B2
(45) Date of Patent: Aug. 11, 2015

(54) METHOD, APPARATUS AND SYSTEM FOR TWO-NODE CLUSTER HOT BACKUP

(75) Inventor: Ying Xie, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 13/295,548

(22) Filed: Nov. 14, 2011

(65) Prior Publication Data

US 2012/0057453 A1 Mar. 8, 2012

Related U.S. Application Data

(63) Continuation of application No. PCT/CN2010/073413, filed on Jun. 1, 2010.

(30) Foreign Application Priority Data

Jun. 9, 2009 (CN) .......................... 2009 1 0108021

(51) Int. Cl.

| H04L 1/00 | (2006.01) |
|---|---|
| H04L 12/707 | (2013.01) |
| H04L 12/703 | (2013.01) |
| H04L 12/713 | (2013.01) |
| H04L 29/14 | (2006.01) |
| G06F 11/20 | (2006.01) |

(52) U.S. Cl.
CPC .............. *H04L 45/22* (2013.01); *H04L 45/28* (2013.01); *H04L 45/586* (2013.01); *H04L 69/40* (2013.01); *G06F 11/2028* (2013.01); *G06F 11/2038* (2013.01); *G06F 11/2048* (2013.01)

(58) Field of Classification Search
USPC .................................................. 370/216–228
See application file for complete search history.

(56) References Cited

U.S. PATENT DOCUMENTS

| 6,631,136 B1 | 10/2003 | Chowdhury et al. |
|---|---|---|
| 8,009,556 B2 * | 8/2011 | May .............................. 370/219 |

(Continued)

FOREIGN PATENT DOCUMENTS

| CN | 1567737 A | 1/2005 |
|---|---|---|
| CN | 1968163 A | 5/2007 |

(Continued)

OTHER PUBLICATIONS

TR-101 Migration to Ethernet-Based Broadband Aggregation, Broadband Forum Technical Report, Issue 2, Jul. 2011.

(Continued)

*Primary Examiner* — Alvin Zhu
(74) *Attorney, Agent, or Firm* — Brinks Gilson & Lione

(57) ABSTRACT

A method, an apparatus and a system for two-node cluster hot backup is provided. A second network node configures a redundancy protocol with a first network node at an access port to negotiate an active/standby relationship between each local access port and each access port of the first network node, releases a route of a network segment of a user, where the network segment of the user is the same as a network segment of a user to which a route released by the first network node belongs, establishes or specifies a protection channel with the first network node, synchronizes user information with the first network node, and when the first network node has a failure, performs service switching according to the redundancy protocol, and sends a downstream traffic to the user according to the user information.

18 Claims, 3 Drawing Sheets

(56) References Cited

U.S. PATENT DOCUMENTS

2005/0083953 A1 4/2005 May
2009/0296568 A1 12/2009 Kitada

FOREIGN PATENT DOCUMENTS

| CN | 101316239 A | 12/2008 |
|---|---|---|
| CN | 101447858 A | 6/2009 |
| CN | 101577719 A | 11/2009 |
| JP | 2002232463 A | 8/2002 |
| JP | 2005130049 A | 5/2005 |
| WO | WO 2005/039129 A1 | 4/2005 |
| WO | WO 2008/120267 A1 | 10/2008 |

OTHER PUBLICATIONS

First Chinese Office Action dated (mailed) Jun. 27, 2011, issued in related Chinese Application No. 200910108021.4 Huawei Technologies Co., Ltd.

Second Chinese Office Action dated (mailed) Aug. 18, 2011, issued in related Chinese Application No. 200910108021.4 Huawei Technologies Co., Ltd.

Itsuo Kuramoto et al., "Increasing FTTH Reliability between Premise and Indoor Lines," OWP1, Optical Society of America, OCIS codes: (350.4600) Optical engineering; (120.4640) Optical Instruments, 2004.

Written Opinion of the International Searching Authority (translation) dated (mailed) Aug. 19, 2010, issued in related Application No. PCT/CN2010/073413, filed Jun. 1, 2010, Huawei Technologies Co., Ltd.

International Search Report for International Application No. PCT/CN2010/073413, mailed Aug. 19, 2010, Huawei Technologies Co., Ltd.

Chinese Office Action (Partial Translation) of Chinese Patent Application No. 200910108021.4; dated (mailed) Feb. 28, 2012; Chinese version included (10 pgs.).

Extended European Search Report mailed Jun. 26, 2012, issued in related European Application No. 10785723.7, Huawei Technologies Co., Ltd. (6 pages).

Office Action issued in corresponding Mexican Patent Application No. MX/a/2011/012651, mailed Sep. 19, 2012.

Office Action issued in corresponding Japanese Patent Application No. 2012-514335, mailed May 7, 2013, 6 pages.

Bonaventure et al., "Achieving Sub-50 Milliseconds Recovery Upon BGP Peering Link Failures" IEEE/ACM Transactions on Networking, vol. 15, No. 5, Oct. 2007, 13 pages.

Office Action issued in corresponding Mexican Patent Application No. MX/a/2011/012651, mailed Apr. 5, 2013, 5 pages.

* cited by examiner

METHOD, APPARATUS AND SYSTEM FOR TWO-NODE CLUSTER HOT BACKUP

CROSS-REFERENCE TO RELATED APPLICATIONS

This application is a continuation of International Application No. PCT/CN2010/073413, filed on Jun. 1, 2010, which claims priority to Chinese Patent Application No. 200910108021.4, filed with the Chinese Patent Office on Jun. 9, 2009, both of which are hereby incorporated by reference in their entireties.

FIELD OF THE INVENTION

The present invention relates to the field of network communications, and in particular, to a method, an apparatus and a system for two-node cluster hot backup.

BACKGROUND OF THE INVENTION

Nowadays, an Internet Protocol (IP) network is developing toward the direction of multi-service, and needs to support multiple services such as Next Generation Network (WIN), 3rd-generation (3G), Internet Protocol Television (IPTV) and data services. The IP network serves as a bearer network in an entire network. Compared with a conventional data service, a multi-service network, is quite demanding on reliability of the bearer network, and service reliability has gradually become one of the core competitiveness of data communications equipment.

In a router or a layer-3 switch of an IP or a Multi-Protocol Label Switch (MPLS) core network, the service reliability may be implemented through technologies such as a routing protocol, Graceful Restart (GR), Fasi Reroute (FRR), or Traffic Engineering (TE) protection group. On an Ethernet Lan-switch of a layer-2 network, the service reliability may be implemented through layer-2 redundancy protocols such as a Spanning Tree Protocol (STP), a Rapid Spanning Tree Protocol (RSTP) or a Multiple Spanning Tree Protocol (MSTP).

A service node in a convergence layer or an edge layer needs to support inter-device two-node cluster hot backup (inter-chassis/inter-node redundancy). An existing method for two-node cluster hot backup includes: configuring a redundancy protocol at access ports of two nodes for negotiating active/standby ports of the access ports, triggering service protection switching in the case that a peer port has a failure; and triggering service revertive switching after a primary node is restored. The two nodes synchronize user information (session-info or user-info) with each other through a certain protocol, so as to ensure that when an entire node has a failure or a link has a failure, a backup node has adequate information to quickly restore a service.

Apart from implementing the redundancy protocol and user information synchronization, a two-node cluster backup solution also needs to solve a problem of forwarding a traffic from the core network to a user, namely a downstream traffic, in various failure scenarios (including a link failure, a port failure, a line card failure, an entire node failure and service revertive switching).

An existing solution solves the problem of forwarding the downstream traffic through releasing or withdrawing a route. For example, a network segment can only be applied at one access port; when the access port is promoted to an active access port, a node where the active access port is located releases a route of the network segment; and when the access port is switched from the active access port to a standby access port, the route of the network segment is withdrawn.

In the solution, after service switching or service revertive switching due to a failure, the downstream traffic cannot be restored to a normal state until the route is converged. Route convergence time is mainly decided by a routing calculation interval of the routing protocol. If the routing calculation interval is configured too short, a load of a Central Process Unit (CPU) of a router is increased; and if the routing calculation interval is configured too long, the route convergence time is prolonged accordingly, which goes against quick restoration of the service. In addition, for a service node, an IP address network segment is usually allocated globally, or allocated according to services. If it is restricted that one IP network segment can only be applied at one access port, user addresses are wasted, and at the same time, service deployment is difficult.

In another solution, a node releases a host route of an online user; when the user is online at an access port, a node where the access port is located releases the host route of the user; and when the access port where the user is located is switched to a standby state, the host route of the user is withdrawn. This manner supports a global application of the network segment at the node. However, this technology also has a route convergence problem: After service switching or service revertive switching due to a failure of the user, a service of the user cannot be restored to a normal state until the route is converged. In addition, because the host route of each user needs to be released, requirements on a hot backup node, and a routing capacity and performance of another router in the network are high. During service switching or service revertive switching due to a failure, the node needs to release or withdraw the host route of each user, which brings a great impact on the hot backup node, and CPUs of another router and a layer-3 switch in the network.

SUMMARY OF THE INVENTION

The present invention aims at providing a method, an apparatus and a system for two-node cluster hot backup, so as to solve a problem that downstream traffic switching and revertive switching are slow in a failure scenario of the two-node cluster hot backup.

The objectives of the embodiments of the present invention are implemented through the following technical solutions.

According to one aspect of the present invention, a method for two-node cluster hot backup includes:

configuring, by a second network node, a redundancy protocol with a first network node at an access port to negotiate an active/standby relationship between each local access port and each access port of the first network node;

releasing, by the second network node, a route of a network segment of a user, where the network segment of the user is the same as a network segment of a user to which a route released by the first network node belongs;

establishing or specifying, by the second network node, a protection channel with the first network node;

synchronizing, by the second network node, user information with the first network node; and when the first network node has a failure, performing, by the second network node, service switching according to the redundancy protocol, and sending a downstream traffic to the user according to the user information.

According to another aspect of the present invention, a network node includes at least one access port, a synchronizing module, a release module, an establishing module and a sending module, where the access port is configured to configure a redundancy protocol with a first network node to negotiate an active/standby relationship with an access port of the first network node;

the synchronizing module is configured to synchronize user information with the first network node;

the release module is configured to release a route of a network segment of a user, where the network segment of the user is the same as a network segment of a user to which a route released by the first network node belongs;

the establishing module is configured to establish or specify a protection channel with the first network node; and the sending module is configured to perform service switching according to the redundancy protocol, and send a downstream traffic to the user according to the user information.

According to another aspect of the present invention, a two-node cluster hot backup system includes a first network node and a second network node, where the first network node is configured to configure a redundancy protocol with the second network node at an access port to negotiate an active/standby relationship between each access port of the first network node and each access port of the second network node, and release a route of a network segment of a user; and the second network node is configured to configure a redundancy protocol with the first network node at an access port to negotiate an active/standby relationship between each access port of the second network node and each access port of the first network node; release a route of a network segment of a user, where the network segment of the user is the same as the network segment of the user to which the route released by the first network node belongs; establish or specify a protection channel with the first network node; synchronize user information with the first network node; and when the first network node has a failure, perform service switching according to the redundancy protocol, and send a downstream traffic to the user according to the user information.

By adopting the technical solutions provided in the embodiments, the protection channel is established or specified between the network nodes of the two-node cluster hot backup, and the two network nodes release the same route of the network segment of the user, so that the route of the network segment of the user does not need to be released or withdrawn during downstream traffic switching and revertive switching processes, and in most cases, the network does not need to re-calculate a route. Therefore, performance of the downstream traffic switching and service revertive switching is significantly improved, which greatly shortens service interruption time, and solves the problem that the downstream traffic switching and revertive switching are slow in a failure scenario of the two-node cluster hot backup.

BRIEF DESCRIPTION OF THE DRAWINGS

To illustrate the technical solutions according to the embodiments of the present invention or in the prior art more clearly, accompanying drawings required for describing the embodiments or the prior art are briefly introduced below. Apparently, the accompanying drawings in the following descriptions are merely some embodiments of the present invention, and persons of ordinary skill in the art may also obtain other drawings according to the accompanying drawings without creative efforts.

DETAILED DESCRIPTION OF THE EMBODIMENTS

In order to make the foregoing objectives, features and advantages of the embodiments of the present invention clearer and easier to understand, the embodiments of the present invention are further described in detail below with reference to the accompanying drawings and specific implementations.

The embodiments of the present invention are described below with reference to FIG. 1 to FIG. 3.

Figure 1:
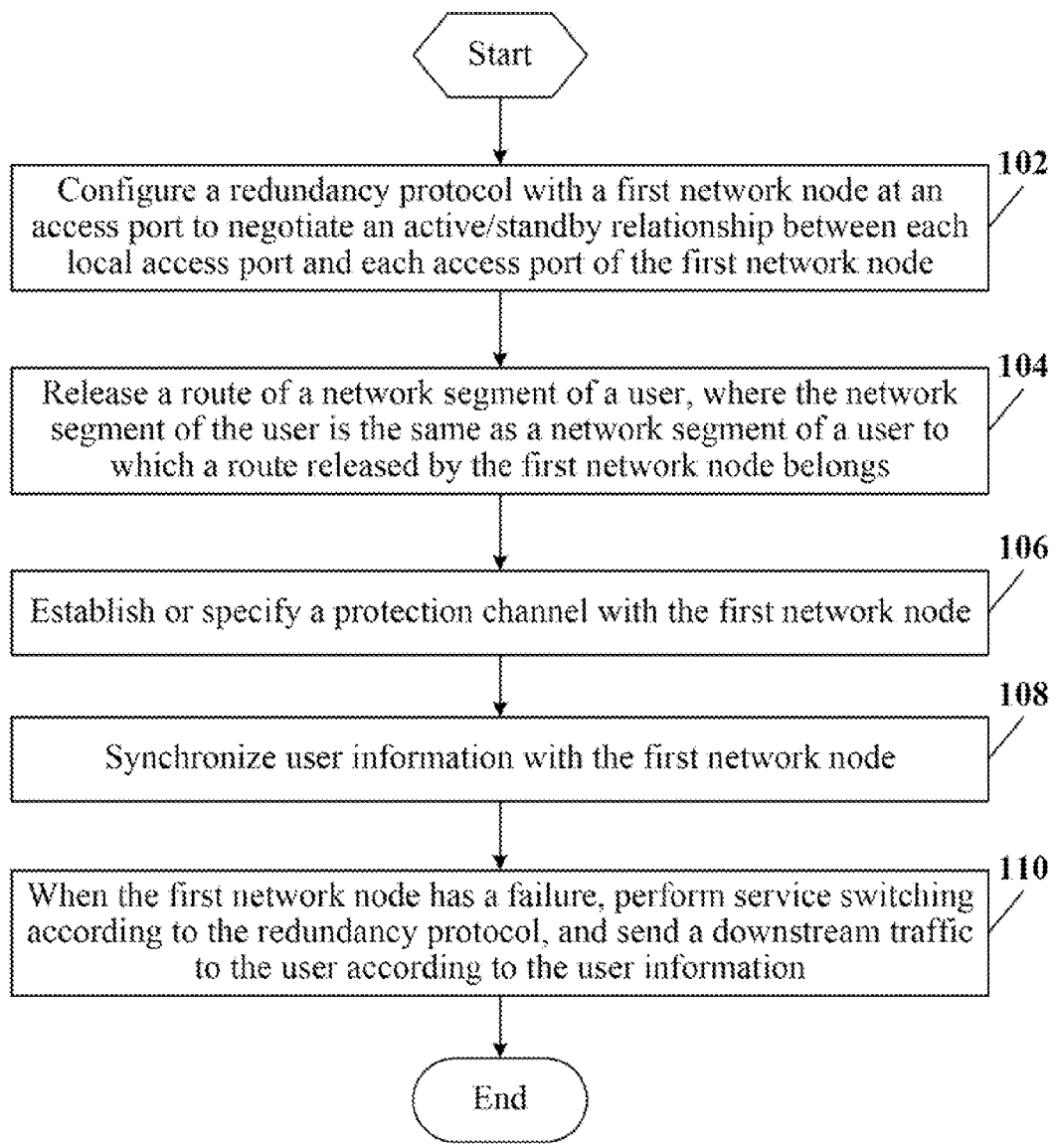
FIG. 1 is a flow chart of a method for two-node cluster hot backup according to an embodiment of the present invention.

FIG. 1 is a flow chart of a method for two-node cluster hot backup according to an embodiment of the present invention. The method includes:

102: Configure a redundancy protocol with a first network node at an access port to negotiate an active/standby relationship between each local access port and each access port of the first network node.

Specifically, the redundancy protocol with the first network node may be configured at an access port of a second network node to negotiate an active/standby relationship between each access port of the second network node and each access port of the first network node. For example, it is determined according to negotiation that an access port B of the second network node serves as a standby access port of an access port A of the first network node, and it is determined according to negotiation that an access port C of the first network node serves as a standby access port of another access port D of the second network node. One access port cannot be both an active access port and a standby access port at the same time. According to the redundancy protocol, service switching is triggered when the access port of the first network node has a failure, and service revertive switching is triggered after the access port of the first network node is restored from the failure.

104: Release a route of a network segment of a user, where the network segment of the user is the same as a network segment of a user to which a route released by the first network node belongs.

Different users in a same network segment may be online through an active access port of the first network node or an active access port of the second network node.

106: Establish or specify a protection channel with the first network node.

The protection channel is established or specified between the second network node and the first network node through an IP or MPLS core network, or the protection channel is established between the second network node and the first network node through a directly-connected link. The protection channel may be a TE tunnel, a Generic Routing Encapsulation (GRE) tunnel, a Label Distribution Protocol (LDP) Label Switched Path (LSP) tunnel or an IP Security (IPSEC) tunnel, and may also be a directly-connected Ethernet link, an Asynchronous Transfer Mode (ATM) link or a Point-to-Point Protocol (PPP) link. When the protection channel is an existing tunnel between the second network node and the first network node, for example, the LDP LSP tunnel, the existing tunnel only needs to be specified as the protection channel.

The protection channel should ensure a bi-directional transmission capacity. Therefore, when it is a unidirectional tunnel such as a TE tunnel, two tunnels respectively from the second network node to the first network node and from the first network node to the second network node need to be established or specified; and when it is a bi-directional tunnel, only one tunnel needs to be established or specified.

With respect to a packet sent to the user, as long as the packet can arrive at either the second network node or the first network node, the packet may arrive at the user directly, or arrive at the user by the other network node through the protection channel. For example, the user is online through an active access port of the first network node. When a packet sent to the user arrives at the second network node, the packet arrives at the first network node through the protection channel, and arrives at the user by the active access port through which the user is online. Therefore, route deployment in this embodiment is simple, and the route does not need to be released or withdrawn during service switching due or service revertive switching to a failure; instead, the route of the network segment of the user is released at both network nodes. If the route needs to be optimized, interference may be implemented through configuring a routing policy, so that the route of the network segment preferentially points to a network node with a higher priority. For example, if all or most of the access ports of the first network node are active access ports, an operator expects the route of the network segment to preferentially point to the first network node, so as to improve routing efficiency. In this manner, the routing policy may be configured, so that a priority of the first network node is higher.

In order to avoid a loop of the packet between the two nodes, two solutions are provided: (1) perform split horizon on a packet, where the packet is received from the protection channel and a destination address of the packet belongs to the network segment of the user, and forbid re-sending a looped packet to the protection channel; and (2) if TTL of a packet with a destination address belonging to the network segment of the user exceeds a set value, change the TTL to the set value; if the TTL does not exceed the set value, subtract 1 from the TTL in a conventional manner, where the set value is set according to a specific property of the protection channel, and is usually a small value, for example, 2 or 3.

Persons of ordinary skill in the art may understand that the establishing or specifying the protection channel with the first network node is relatively independent, and may be implemented before or after 102 and 104 according to a specific situation.

108: Synchronize user information with the first network node.

The second network node synchronizes the user information with the first network node, so that the second network node has adequate information to send a downstream traffic to the user when the first network node has a failure or a link has a failure, thus quickly restoring a service.

110: When the first network node has a failure, perform service switching according to the redundancy protocol, and send a downstream traffic to the user according to the user information.

The first network node may have a failure due to different causes.

In an application scenario of the embodiment of the present invention, an access link or an access port of the user of the first network node has a failure. In this case, the user service is switched to a standby access port of the access port where the failure occurs, where the standby access port of the access port where the failure occurs is determined according to the redundancy protocol and negotiation on the second network node, and the standby access port is promoted to an active access port. Because both the first network node and the second network node release the route of the network segment of the user, the downstream traffic may directly arrive at the second network node, or may first arrive at the first network node. If the downstream traffic first arrives at the first network node, the first network node sends the downstream traffic to the second network node through the protection channel, and the second network node sends, according to the user information, the downstream traffic to the user by the access port determined through negotiation and according to the protocol. If the downstream traffic directly arrives at the second network node, the second network node directly sends, according to the user information, the downstream traffic to the user by the access port determined through negotiation and according to the protocol. In either case, the downstream traffic may arrive at the user, and therefore the route does not need to be changed. During the service revertive switching after the access link of the first network node or the access port of the first network node is restored from the failure, the route does not need to be changed either.

During service switching and service revertive switching processes in the foregoing application scenario, the route of the network segment of the user does not need to be released or withdrawn, and the network does not need to re-calculate a route. Therefore, performance of the service switching and service revertive switching is significantly improved, thus greatly shortening service interruption time.

In another application scenario of the embodiment of the present invention, the first network node is a device with multiple line cards, and is connected to a core network through ports of the multiple line cards. A line card where an access port of the user of the first network node is located has a failure. In this case, other line cards of the first network node work normally, the first network node and the core network are still connected, and a protection channel to the second network node is still normal. Therefore, similar to the scenario where the access link or port of the user of the first network node has a failure, during service switching and service revertive switching processes, the route of the network segment of the user does not need to be released or withdrawn, and the network does not need to re-calculate a route. As a result, performance of the service switching and service revertive switching is significantly improved, thus greatly shortening service interruption time.

In another application scenario of the embodiment of the present invention, the entire first network node has a failure. In this case, the protection channel from the first network node to the second network node cannot work normally. Therefore, the route of the network segment of the user does not automatically point to the second network node until the route is converged. At this time, the packet sent to the user is directly sent to the second network node through the core network. In this scenario, because the second network node already releases the route of the network segment of the user, the route does not need to be released again during the service switching; therefore, performance of the service switching is improved to a certain extent. In addition, as long as the first network node is restored, the protection channel is restored to the normal state. The downstream traffic may finally arrive at the user through either the first network node or the second network node. Therefore, during a service revertive switching process, the first network node does not need to release the route, the second network node also does not need to withdraw the route. Performance of the service revertive switching is significantly improved, thus greatly shortening service interruption time.

Figure 2:
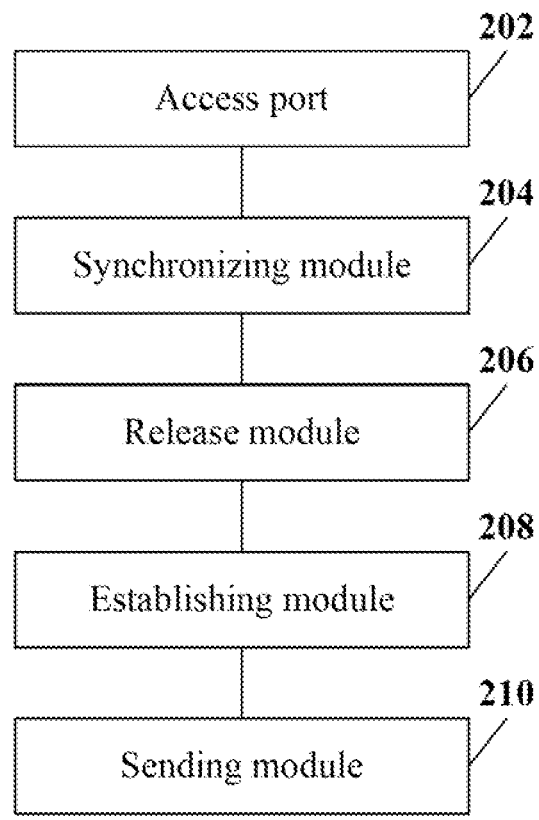
FIG. 2 is a block diagram of a network node according to an embodiment of the present invention.

FIG. 2 is a block diagram of a network node according to an embodiment of the present invention. The network node includes at least one access port 202, a synchronizing module 204, a release module 206, an establishing module 208 and a sending module 210.

The access port 202 is configured to configure a redundancy protocol with a first network node.

The access port 202 configures the redundancy protocol with the first network node, where the redundancy protocol is used to negotiate active/standby ports with an access port of the first network node. For example, it is determined according to negotiation that the access port 202 is a standby access port of an access port of the first network node, or it is determined according to negotiation that an access port of the first network node is a standby access port of the access port 202. According to the redundancy protocol, service switching is triggered in the case that the access port of the first network node has a failure, and service revertive switching is triggered after the access port of the first network node is restored from the failure.

The synchronizing module 204 is configured to synchronize user information with the first network node.

The synchronizing module 204 synchronizes the user information with the first network node, so that the second network node has adequate information to quickly restore a service when the first network node has a failure or a link has a failure.

The release module 206 is configured to release a route of a network segment of a user, where the network segment of the user is the same as a network segment of a user to which a route released by the first network node belongs.

The establishing module 208 is configured to establish or specify a protection channel with the first network node.

The establishing module 208 establishes or specifies the protection channel between the second network node and the first network node through an IP or MPLS core network, or establishes the protection channel between the second network node and the first network node through a directly-connected link. The protection channel may be a TE tunnel, a GRE tunnel, an LDP LSP tunnel or an IPSEC tunnel, and may also be a directly-connected Ethernet link, an ATM link or a PPP link. When the protection channel is an existing tunnel between the second network node and the first network node, for example, the LDP LSP tunnel, the existing tunnel only needs to be specified as the protection channel. The protection channel should ensure a bi-directional transmission capacity. Therefore, when it is a unidirectional tunnel such as a TE tunnel, two tunnels respectively from the second network node to the first network node and from the first network node to the second network node need to be established or specified; and when it is a bi-directional tunnel, only one tunnel needs to be established or specified.

With respect to a packet sent to the user, as long as the packet can arrive at either the second network node or the first network node, the packet may arrive at the user directly, or arrive at the user by the other network node through the protection channel. For example, the user is online through an active access port of the first network node. When a packet sent to the user arrives at the second network node, the packet arrives at the first network node through the protection channel, and arrives at the user by the access port through which the user is online. Therefore, route deployment is simple, and the route does not need to be released or withdrawn during service switching or service revertive switching due to a failure; instead, the route of the IP network segment of the user may be released at both network nodes. If the route needs to be optimized, interference may be implemented through configuring a routing policy, so that the route of the IP network segment preferentially points to a network node with a higher priority. For example, if all or most of the access ports of the first network node are active access ports, an operator expects the route of the network segment to preferentially point to the first network node, so as to improve routing efficiency. In this manner, the routing policy may be configured, so that a priority of the first network node is higher.

In order to avoid a loop of the packet between the two nodes, two solutions are provided: (1) perform split horizon on a packet, where the packet is received from the protection channel and a destination address of the packet belongs to the network segment of the user, and forbid re-sending a looped packet to the protection channel; and (2) if TTL of a packet with a destination address belonging to the network segment of the user exceeds a set value, change the TTL to the set value; if the TTL does not exceed the set value, subtract 1 from the TTL in a conventional manner, where the set value is set according to a specific property of the protection channel, and is usually a small value, for example, 2 or 3.

The sending module 210 is configured to send a downstream traffic to the user according to the user information and the redundancy protocol.

When the first network node does not have a failure, the sending module 210 sends the downstream traffic to the user according to the user information.

When the first network node has a failure, the sending module 210 performs service switching according to the redundancy protocol, and sends the downstream traffic to the user according to the user information.

The first network node may have a failure due to different causes.

In an application scenario of the embodiment of the present invention, an access link or an access port of the user of the first network node has a failure. In this case, the user service is switched to a standby access port of the access port where the failure occurs, where the standby access port of the access port where the failure occurs is determined according to the redundancy protocol and negotiation, and the standby access port is promoted to an active access port. Because both the first network node and the second network node release the route of the network segment of the user, the downstream traffic may directly arrive at the second network node, or may first arrive at the first network node. For example, it is determined according to the redundancy protocol and negotiation that the access port 202 is a standby access port of an access port of the first network node. When the access port of the first network node has a failure, the access port 202 is promoted to an active access port. If the downstream traffic first arrives at the first network node, the first network node sends the downstream traffic to the second network node through the protection channel, and the sending module 210 of the second network node sends the downstream traffic to the user according to the user information through the access port 202. If the downstream traffic directly arrives at the second network node, the sending module 210 directly sends the downstream traffic to the user according to the user information through the access port 202. In either case, the downstream traffic may arrive at the user, and therefore the route does not need to be changed. During the service revertive switching after the access link of the first network node or the access port of the first network node is restored from the failure, the route does not need to be changed either.

During service switching and service revertive switching processes in the foregoing application scenario, the route of the network segment of the user does not need to be released or withdrawn, and the network does not need to re-calculate a route. Therefore, performance of the service switching and service revertive switching is significantly improved, thus greatly shortening service interruption time.

In another application scenario of the embodiment of the present invention, the first network node is a device with multiple line cards, and is connected to a core network through ports of the multiple line cards. A line card where an access port of the user of the first network node is located has a failure. In this case, other line cards of the first network node work normally, the first network node and the core network are still connected, and a protection channel to the second network node is also normal. Therefore, similar to the scenario where the access link or port of the user of the first network node has a failure, during service switching and service revertive switching processes, the route of the network segment of the user does not need to be released or withdrawn, and the network does not need to re-calculate a route. As a result, performance of the service switching and service revertive switching is significantly improved, thus greatly shortening service interruption time.

In another application scenario of the embodiment of the present invention, the entire first network node has a failure. In this case, the protection channel from the first network node to the second network node cannot work normally. Therefore, the route of the network segment of the user cannot automatically point to the second network node until the route is converged. The packet sent to the user is directly sent to the second network node through the core network. In this scenario, because the second network node already releases the route of the network segment of the user, the route does not need to be released again during the service switching; therefore, performance of the service switching is improved to a certain extent. In addition, as long as the first network node is restored, the protection channel is restored to a normal state. The downstream traffic may finally arrive at the user through either the first network node or the second network node. Therefore, during a service revertive switching process, the first network node does not need to release the route, the second network node also does not need to withdraw the route. Performance of the service revertive switching is significantly improved, thus greatly shortening service interruption time.

Figure 3:
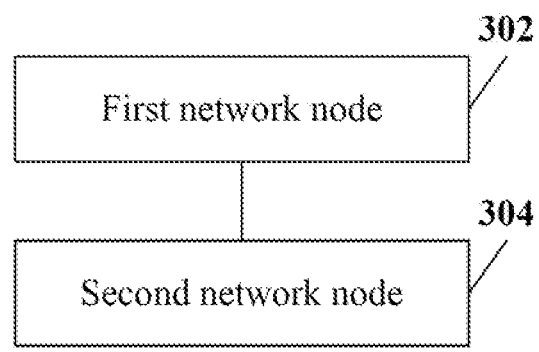
FIG. 3 is a block diagram of a system for two-node cluster hot backup according to an embodiment of the present invention.

FIG. 3 is a block diagram of a system for two-node cluster hot backup according to an embodiment of the present invention. The system includes a first network node and a second network node.

A first network node 302 is configured to configure a redundancy protocol with a second network node 304 at an access port to negotiate an active/standby relationship between each access port of the first network node 302 and each access port of the second network node 304, and release a route of a network segment of a user.

The second network node 304 is configured to configure a redundancy protocol with the first network node 302 at an access port to negotiate an active/standby relationship between each access port of the second network node 304 and each access port of the first network node 302; release a route of a network segment of a user, where the network segment of the user is the same as the network segment of the user to which the route released by the first network node 302 belongs; establish or specify a protection channel with the first network node 302; synchronize user information with the first network node 302; and when the first network node has a failure, perform service switching according to the redundancy protocol, and send a downstream traffic to the user according to the user information.

Figure 4:
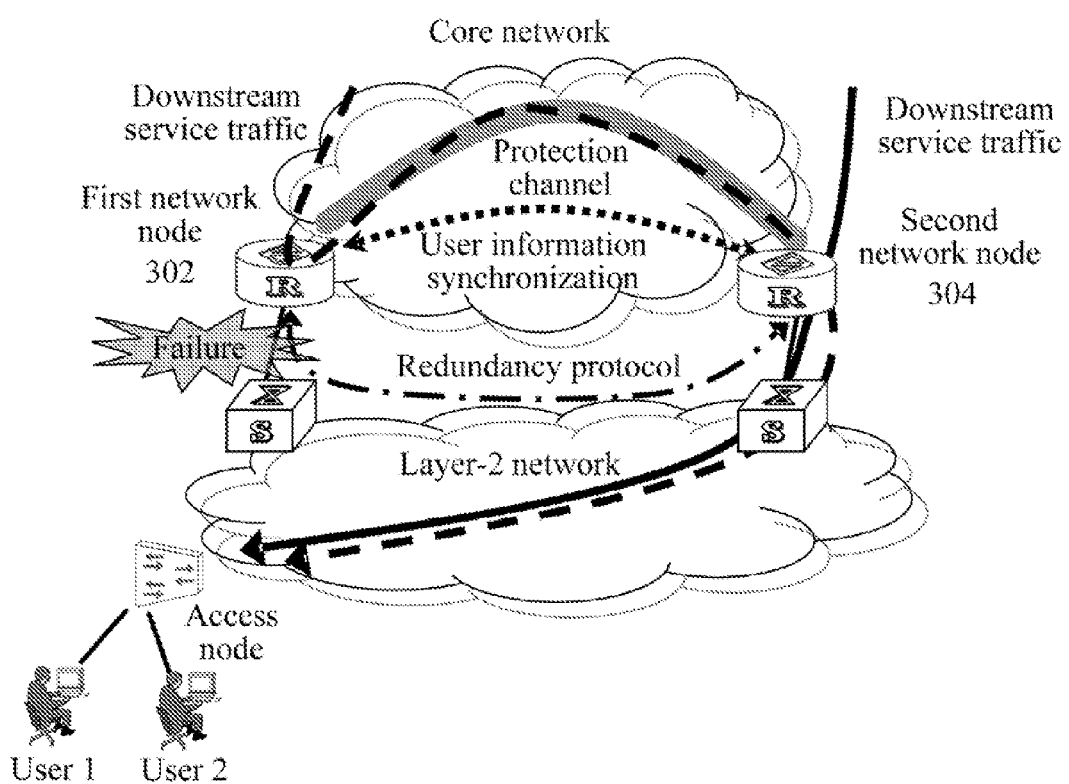
FIG. 4 is a schematic diagram of a failure scenario of a system for two-node cluster hot backup according to an embodiment of the present invention.

Referring to FIG. 4, FIG. 4 is a schematic diagram of a failure scenario of a system for two-node cluster hot backup according to an embodiment of the present invention. In the system for two-node cluster hot backup, different users of a same network segment may be online through an access port of the first network node 302, and may also be online through an access port of the second network node 304. For example, a user 1 is online through an access port A of the first network node 302, and it is determined according to a redundancy protocol and negotiation that an access port B of the second network node 304 is a standby access port of the access port A. A user 2 is online through an access port D of the second network node 304, and it is determined according to the redundancy protocol and negotiation that an access port C of the first network node 302 is a standby access port of the access port D. In the specific failure scenario, an access link or an access port of the user 1 of the first network node 302 has a failure. In this case, a service of the user 1 is switched to the standby access port B of the access port where the failure occurs, where the standby access port B of the access port where the failure occurs is determined according to the redundancy protocol and negotiation on the second network node 304, the access port B is promoted to an active access port, and the user 2 does not need to be switched. Because both the first network node 302 and the second network node 304 release the route of the network segment of the user, a downstream traffic may directly arrive at the second network node 304, or may first arrive at the first network node 302. If the downstream traffic first arrives at the first network node 302, the first network node 302 sends the downstream traffic to the second network node 304 through a protection channel according to user information, and the second network node 304 sends the downstream traffic to the user through a corresponding access port according to the user information. If the downstream traffic directly arrives at the second network node 304, the second network node 304 sends the downstream traffic to the user through a corresponding access port according to the user information. In either case, the downstream traffic may arrive at the user, and therefore the route does not need to be changed. During the service revertive switching after the access link of the first network node or the access port of the first network node is restored from the failure, the route does not need to be changed either.

During service switching and service revertive switching processes in an application scenario shown in FIG. 4, the route of the network segment of the user does not need to be released or withdrawn, and the network does not need to re-calculate a route. Therefore, performance of the service switching and service revertive switching is significantly improved, thus greatly shortening service interruption time.

By adopting the technical solutions provided in the embodiments, the protection channel is established or specified between the network nodes of the two-node cluster hot backup, and the two network nodes release the same route of the network segment of the user, so that the route of the network segment of the user does not need to be released or withdrawn during downstream traffic switching and revertive switching processes, and in most cases, the network does not need to re-calculate a route. Therefore, performance of the downstream traffic switching and service revertive switching is significantly improved, which greatly shortens service interruption time, and solves the problem that the downstream traffic switching and revertive switching are slow in a failure scenario of the two-node cluster hot backup.

Persons of ordinary skill in the art should understand that, all of or part of steps in the method of the foregoing embodiments may be implemented by a program instructing relevant hardware. The program may be stored in a computer readable storage medium. The storage medium may be a ROM/RAM, a magnetic disk, or an optical disk.

The foregoing embodiments are merely exemplary embodiments of the present invention, and are not intended to limit the protection scope of the present invention. Any modification, equivalent replacement or improvement without departing from the spirit and principle of the present invention shall fall within the protection scope of the present invention.

What is claimed is:

1. A method for two-node cluster hot backup in a network, the network including a first network node having a first access port and a second network node having a second access port, the method comprising:
   configuring, by the second network node at the second access port, a redundancy protocol with the first network node to negotiate an active/standby relationship between the second access port and the first access port, wherein the second network node in communication with a user via the second access port, the first network node in communication with the user via the first access port, wherein the second access port serves as a standby access port of the first access port;
   advertising to a core network node, by the second network node, a second route for a network segment of the user, wherein a first route for the network segment of the user is advertised by the first network node to the core network node;
   synchronizing, by the second network node, user information with the first network node; and
   when the first network node has a failure, switching, by the second network node, service according to the redundancy protocol, and if downstream traffic to the user arrives at the second network node according to the second route, sending, by the second network node, the downstream traffic to the user via the second access port according to the user information.

2. The method according to claim 1, further comprising:
   when the first network node is restored from the failure, performing, by the second network node, service revertive switching according to the redundancy protocol.

3. The method according to claim 1, further comprising:
   establishing or specifying, by the second network node, a protection channel with the first network node; and
   when an access link of the user or the first access port of the first network node has a failure, switching, by the second network node, service according to the redundancy protocol, and if the downstream traffic first arrives at the first network node according to the first route, receiving, by the second network node, through the protection channel the downstream traffic sent by the first network node, and sending, by the second network node, the downstream traffic to the user via the second access port according to the user information.

4. The method according to claim 3, further comprising:
   performing, by the second network node, split horizon on a packet, wherein the packet is received from the protection channel and a destination address of the packet belongs to the network segment of the user; or
   changing, by the second network node, time to live (TTL) of a packet with a destination address belonging to the network segment of the user to a set value if the TTL of the packet exceeds the set value; and subtracting 1 from the TTL if the TTL of the packet does not exceed the set value.

5. The method according to claim 3, wherein the protection channel ensures a bi-directional transmission capacity.

6. The method according to claim 3, wherein the protection channel is one of: a Traffic Engineering (TE) tunnel; a Generic Routing Encapsulation (GRE) tunnel; a Label Switched Path (LSP) tunnel; an Internet Protocol (IP) Security (IPSEC) tunnel; a directly-connected Ethernet link; an Asynchronous Transfer Mode (ATM) link; or a Point-to-Point Protocol (PPP) link.

7. A network node, comprising a second access port, a synchronizing module, a release module and a sending module, wherein
   the second access port is configured to configure a redundancy protocol with a first network node having a first access port to negotiate an active/standby relationship with the first access port, wherein the network node in communication with a user via the second access port, the first network node in communication with the user via the first access port, wherein the second access port serves as a standby access port of the first access port;
   the synchronizing module is configured to synchronize user information with the first network node;
   the release module is configured to advertise to a core network node a second route for a network segment of the user, and wherein a first route for the network segment of the user is advertised by the first network node to the core network node;
   the sending module is configured to, when the first network node has a failure, switch service according to the redundancy protocol, and if downstream traffic to the user arrives at the network node according to the second route, send the downstream traffic to the user via the second access port according to the user information.

8. The network node according to claim 7, further comprising:
   an establishing module configured to establish or specify a protection channel with the first network node; and,
   the network node is further configured to, when an access link of the user or the first access port of the first network node has a failure, switch service according to the redundancy protocol, and if the downstream traffic first arrives at the first network node according to the first route, receive, through the protection channel, the downstream traffic sent by the first network node, and send the downstream traffic to the user via the second access port according to the user information.

9. The network node according to claim 8, wherein the network node is further configured to perform split horizon on a packet, wherein the packet is received from the protection channel and a destination address of the packet belongs to the network segment of the user; or
   change time to live (TTL) of a packet with a destination address belonging to the network segment of the user to a set value if the TTL of the packet exceeds the set value; and subtracting 1 from the TTL if the TTL of the packet does not exceed the set value.

10. The network node according to claim 8, wherein the protection channel is one of: a Traffic Engineering (TE) tunnel; a Generic Routing Encapsulation (GRE) tunnel; a Label Switched Path (LSP) tunnel; an Internet Protocol (IP) Security (IPSEC) tunnel; a directly-connected Ethernet link; an Asynchronous Transfer Mode (ATM) link; or a Point-to-Point Protocol (PPP) link.

11. A system for two-node cluster hot backup, comprising a first network node and a second network node, wherein:

the first network node is in communication with a user via a first access port, the second network node is in communication with the user via a second access port, and wherein the second access port serves as a standby access port of the first access port;

the first network node is configured to configure a redundancy protocol with the second network node at the first access port to negotiate an active/standby relationship between the first access port of the first network node and the second access port of the second network node, and advertise to a core network node, a first route for a network segment of the user; and the second network node is configured to configure a redundancy protocol with the first network node at the second access port to negotiate an active/standby relationship between the second access port of the second network node and the first access port of the first network node; advertise to the core network node, a second route for the network segment of the user, synchronize user information with the first network node; and when the first network node has a failure, switch service according to the redundancy protocol, and if downstream traffic to the network segment of the user arrives at the second network node according to the second route, send the downstream traffic to the user via the second access port according to the user information.

12. The system according to claim 11, wherein
the second network node is further configured to perform service revertive switching according to the redundancy protocol when the first network node is restored from the failure.

13. The system according to claim 11, wherein the second network node is further configured to establish or specify a protection channel with the first network node; and when an access link of the user or the first access port of the first network node has a failure, switch service according to the redundancy protocol, and if the downstream traffic first arrives at the first network node, receive, through the protection channel, the downstream traffic sent by the first network node, and send the downstream traffic to the user via the second access port according to the user information.

14. The system according to claim 13, wherein the second network node is further configured to perform split horizon on a packet, wherein the packet is received from the protection channel and a destination address of the packet belongs to the network segment of the user; or
change time to live (TTL) of a packet with a destination address belonging to the network segment of the user to a set value if the TTL of the packet exceeds the set value; and subtracting 1 from the TTL if the TTL of the packet does not exceed the set value.

15. The system according to claim 13, wherein the protection channel is one of: a Traffic Engineering (TE) tunnel; a Generic Routing Encapsulation (GRE) tunnel; a Label Switched Path (LSP) tunnel; an Internet Protocol (IP) Security (IPSEC) tunnel; a directly-connected Ethernet link; an Asynchronous Transfer Mode (ATM) link; or a Point-to-Point Protocol (PPP) link.

16. A non-transitory computer-readable storage medium for use in a two-node cluster hot backup network, the non-transitory computer-readable storage medium stores program code thereon for use by a second network node, the program code comprising instructions when executed by at least a processor in the second network node, performing operations comprising:

configuring, by the second network node, a redundancy protocol with a first network node at a second access port of the second network node to negotiate an active/standby relationship between the second access port and a first access port of the first network node, wherein the second network node is in communication with a user via the second access port, the first network node is in communication with the user via the first access port, wherein the second access port serves as a standby access port of the first access port;

advertising to a core network node, by the second network node, a second route for a network segment of the user, wherein a first route for the network segment of the user is advertised by the first network node to the core network node;

synchronizing, by the second network node, user information with the first network node; and when the first network node has a failure, switching, by the second network node, service according to the redundancy protocol, and if downstream traffic to the user first arrives at the second network node according to the second route, sending, by the second network node, the downstream traffic to the user via the second access port according to the user information.

17. The non-transitory computer-readable storage medium according to claim 16, wherein the operations further comprise:

establishing or specifying, by the second network node, a protection channel with the first network node; and when an access link of the user or the first access port has a failure, switching, by the second network node, service according to the redundancy protocol, and if the downstream traffic first arrives at the first network node according to the first route, receiving, by the second network node, through the protection channel the downstream traffic sent by the first network node, and sending, by the second network node, the downstream traffic to the user via the second access port according to the user information.

18. The non-transitory computer-readable storage medium according to claim 17, wherein the protection channel is one of: a Traffic Engineering (TE) tunnel; a Generic Routing Encapsulation (GRE) tunnel; a Label Switched Path (LSP) tunnel; an Internet Protocol (IP) Security (IPSEC) tunnel; a directly-connected Ethernet link; an Asynchronous Transfer Mode (ATM) link; or a Point-to-Point Protocol (PPP) link.

* * * * *